United States Patent [19]

Scrivener et al.

[11] Patent Number: 4,523,653
[45] Date of Patent: Jun. 18, 1985

[54] LOAD CELL MASS COMPARATOR

[75] Inventors: Thomas F. Scrivener, Hagerstown; Randall M. Schoonover, Monrovia, both of Md.

[73] Assignees: Frazier Precision Instrument Company, Inc., Gaithersburg; Holometrics, Inc., Derwood, both of Md.

[21] Appl. No.: 587,532

[22] Filed: Mar. 8, 1984

[51] Int. Cl.³ .................. G01G 3/14; G01G 19/14; G01G 21/10

[52] U.S. Cl. ................... 177/147; 177/184; 177/211

[58] Field of Search ........... 177/184, 187, 211, 255, 177/256, 147, 208

[56] References Cited

U.S. PATENT DOCUMENTS

| | | | |
|---|---|---|---|
| 3,797,593 | 3/1974 | Conley | 177/211 X |
| 3,910,365 | 10/1975 | Buchele | 177/208 X |
| 3,982,738 | 9/1976 | Meier et al. | 177/184 X |
| 4,094,368 | 6/1978 | Sann et al. | 177/187 X |
| 4,479,560 | 10/1984 | Day | 177/147 |

Primary Examiner—E. A. Goldberg
Assistant Examiner—Patrick W. Foster

[57] ABSTRACT

A load cell mass comparator wherein a pressure compensated load cell is connected at its upper end to a floating plate through a self-aligning coupling, such as, a universal joint assembly. The floating plate is slidably mounted on a plurality of guide rods extending between fixed upper and lower plates. A spring assembly and shock absorber are mounted between the upper fixed plate and floating plate. The lower end of the load cell is connected to the mass to be calibrated through a universal joint, thrust bearing, and spherical load stop bearing. The construction and arrangement of the components in the load cell mass comparator provides an instrument employed heretofore in a laboratory environment to a commercial environment where masses in the range of 1 to 10,000 pounds can be compared and calibrated.

11 Claims, 10 Drawing Figures

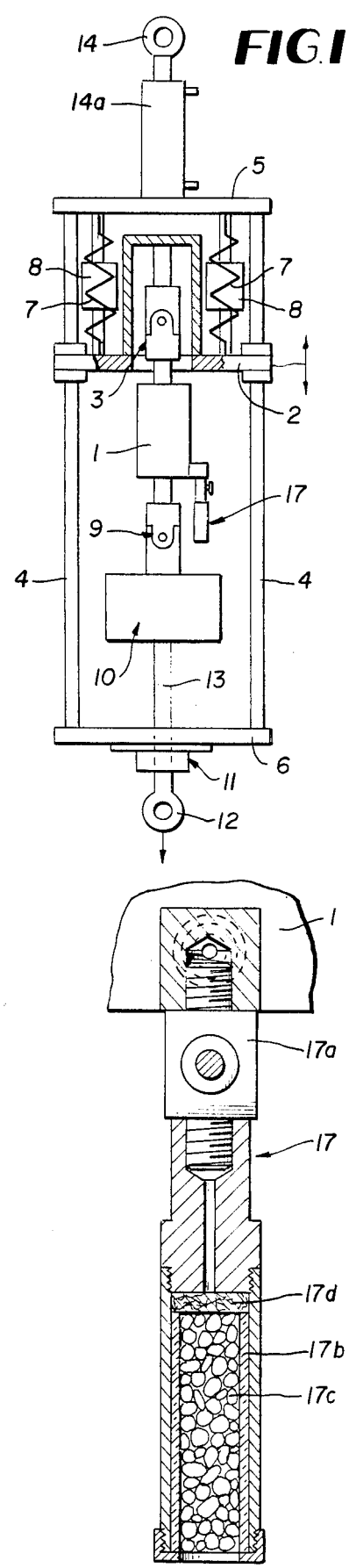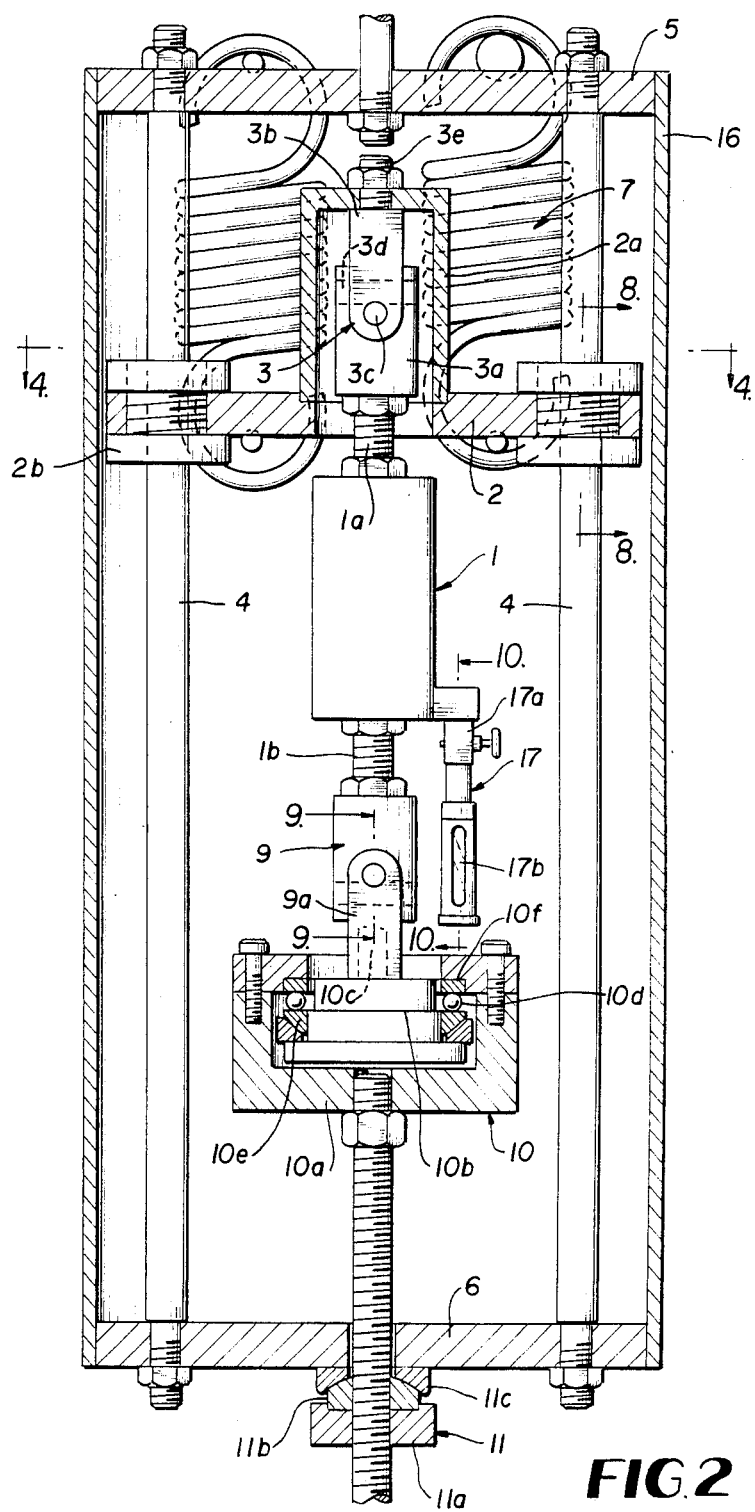

LOAD CELL MASS COMPARATOR

BACKGROUND OF THE INVENTION

The calibration of mass standards is presently performed on conventional mechanical balances wherein masses having an unknown weight are placed on one end of a knife edge supported balance beam and standard weights are mounted on the opposite end of the beam. The slow balance response time and the handling precautions required to protect the knife-edge bearings make this a time consuming process, requiring approximately fifteen minutes to make a precise mass comparison. The calibration time becomes excessive when large numbers of accurate mass comparisons must be made on a daily basis, such as in state weights and measures laboratories.

To overcome the disadvantages experienced in the calibration of mass standards employing the conventional mechanical balances, it has been proposed to use a strain gauge load cell which produces an electric signal in proportion to the force exerted on the cell, the output of the cell being connected to electronic measuring and recording equipment and a computer to thereby automate the measurement process. It has been found that the time required to make a precise mass comparison employing a load cell is less than one-quarter the time required when using a conventional mechanical balance. In addition, measurements can be made more accurately when a large mass difference exists between the test weight and the standard weight.

The load cell mass comparator of the present invention is an improvement on known load cell mass comparators in that its precision, accuracy, repeatability, reliability and range are improved in such a manner to expand its use from a strictly laboratory instrument to a rugged dependable commercial instrument.

The load cell mass comparator of the present invention comprises, essentially, a temperature and pressure compensated load cell connected at its upper end to a floating plate through a universal joint assembly. The floating plate is slidably mounted on a plurality of guide rods extending between fixed upper and lower plates. A variable capacity spring assembly and shock absorbers are mounted between the upper fixed plate and the floating plate. The lower end of the load cell is connected to the mass to be calibrated through a universal joint, thrust bearing, and spherical load stop bearing, and a shell extends between the fixed plates to enclose the components of the comparator.

BRIEF DESCRIPTION OF THE DRAWINGS

FIG. 1 is a diagrammatic view of the load cell mass comparator of the present invention;

FIG. 2 is a side elevational view partly in section, of the comparator shown in FIG. 1;

FIG. 10 is a view taken along line 10—10 of FIG. 2.

DESCRIPTION OF THE PREFERRED EMBODIMENT

Figure 3:
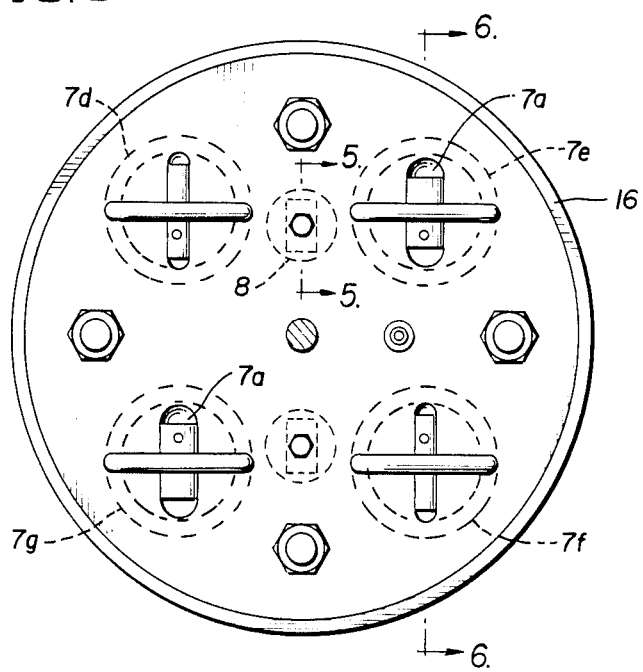
FIG. 3 is a top plan view of the comparator shown in FIG. 2.

Referring to the drawings and more particularly to FIG. 1, the load cell mass comparator of the present invention comprises, a temperature and pressure compensated load cell 1 connected at its upper end to a floating plate 2 through a self-aligning coupling, such as, a universal joint assembly 3. The floating plate 2 is slidably mounted on a plurality of guide rods 4 extending between a fixed upper plate 5 and a fixed lower plate 6. A spring assembly 7 and shock absorbers 8 are mounted between the plates 5 and 6. The lower end of the load cell 1 is connected to the mass to be calibrated through a universal joint 9, a thrust bearing 10, and a spherical load stop bearing 11. The mass to be calibrated is connected to an eyelet 12 provided on the lower end of a threaded stem 13 connected to the thrust bearing 10 and spherical load stop bearing 11. Another eyelet 14 is secured to the upper fixed plate 5 through a hydraulic cylinder 14a so that the entire assembly may be suspended from a suitable support and the comparator can be loaded and unloaded by actuation of the hydraulic cylinder.

Figure 9:
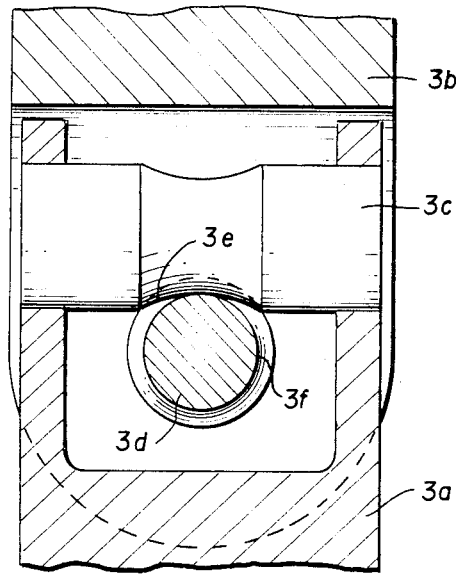
FIG. 9 is an enlarged, side elevational view, partly in section, of the universal joint.

The details of the construction of the load cell mass comparator described in connection with FIG. 1 are shown in FIG. 2, wherein it will be seen that the upper end of the load cell 1 is provided with a threaded stem 1a which is secured to the universal joint assembly 3. As will be seen in FIGS. 2 and 9, the universal joint assembly 3 comprises a pair of cooperating clevises 3a, 3b having their associated pins 3c, 3d disposed normal to each other, the pins being formed with arcuate surfaces 3e, 3f, to thereby provide a substantially point contact between the pins. The lower universal joint assembly 9 is of the same construction as the upper universal joint assembly 3 and is threadably connected to a stem 1b extending from the lower end of the load cell 1. By the construction and arrangement of the universal joint assemblies 3 and 9, axial alignment is maintained between the load cell 1 and the mass to be calibrated.

The upper universal joint assembly 3 is connected to the floating plate 2 through an inverted, cylindrical cup 2a secured to the floating plate 2, the clevis 3b being bolted as at 3e to the bottom wall of the cup 2a. By connecting the universal joint 3 to the floating plate 2 via the cup 2a, the overall length of the comparator is reduced.

Figure 8:
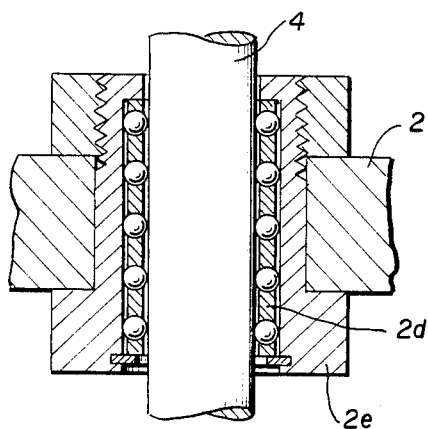
FIG. 8 is a view taken along the line 8—8 of FIG. 2.

As will be seen in FIGS. 2 and 8, the floating plate 2 is slidably mounted on the guide rods 4 by an antifriction bearing 2d secured to the plate 2 by sleeve 2b connected to the plate.

Figure 6:
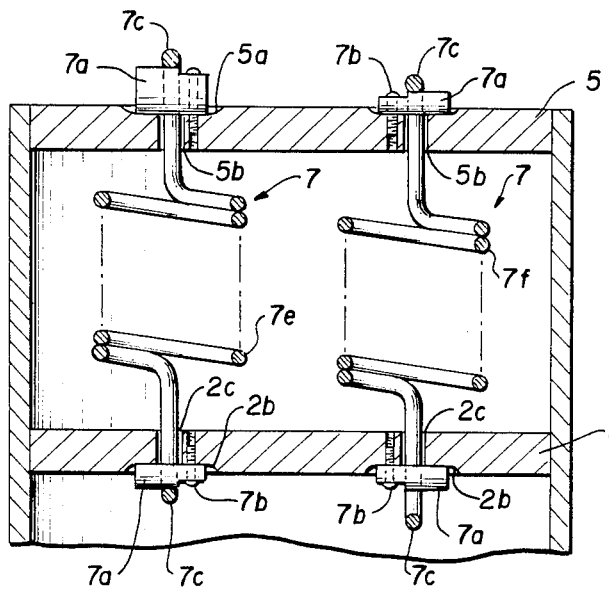
FIG. 6 is a view taken along line 6—6 of FIG. 3.
Figure 7:
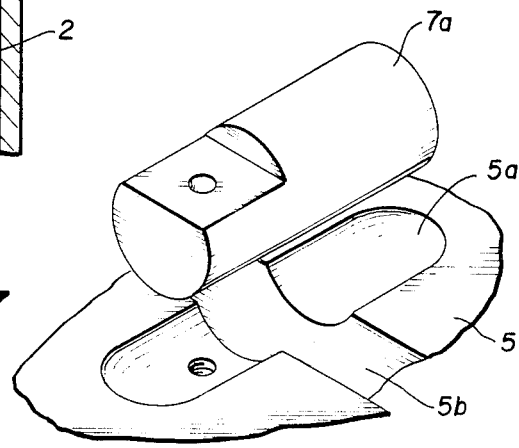
FIG. 7 is a fragmentary, exploded perspective view of a pin employed for securing the ends of the springs to the plates.

Referring to FIGS. 2, 6 and 7, the tension springs 7 are secured between the upper fixed plate 5 and floating plate 2 by transversely extending pins 7a seated in recesses 5a and 2a formed in the respective plates, the pins 7a being secured within the recesses by suitable screws 7b threaded into the plates 2 and 5. Each end of the springs 7 are provided with hook portion 7c which extend through slots 2b and 5b formed in the respective plates. As will be seen in FIG. 3, four springs 7d, 7e, 7f, and 7g are provided and the pins 7a connecting the springs 7e and 7g to the upper fixed plate 5 are of a larger diameter than the remaining pins, whereby there is always a connection between these springs and the respective plates; whereas the lower hook portions 7c on springs 7d and 7f are spaced from the pins 7a on the floating plate 2. By this construction and arrangement the force of a mass below a predetermined value will be resisted by springs 7e and 7g, and a force above the predetermined value will pull the plate 2 downwardly to thereby engage the lower hook portions 7c of springs 7d and 7f, whereby all four springs will resist the force. It will be noted that the springs 7d and 7f are disposed diagonally relative to each other, as are springs 7e and 7g, to thereby provide a balanced resistance to the force of the mass, and by use of the pins 7a, the springs 7 are easily replaceable for changing the range of the comparator.

Figure 5:
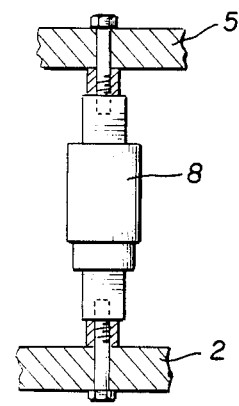
FIG. 5 is a side elevational view of a shock absorber mounted between the upper fixed plate and the floating plate.
Figure 4:
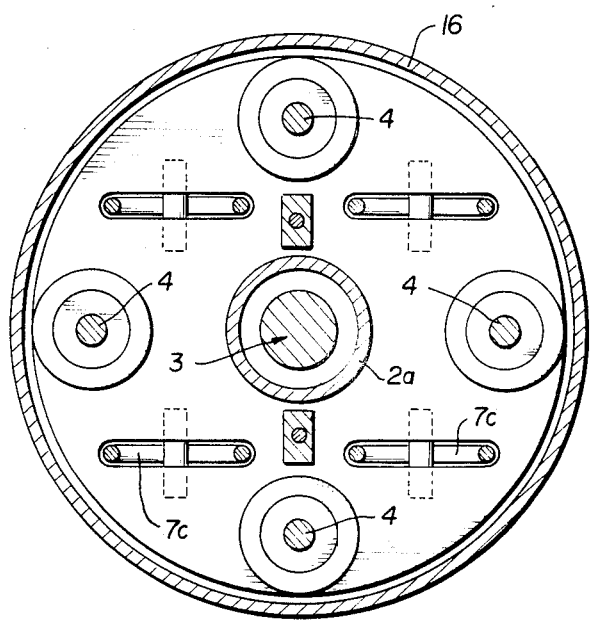
FIG. 4 is a view taken along line 4—4 of FIG. 2.

As will be seen in FIGS. 3 and 5, the shock absorbers 8 are bolted at each end to the fixed upper plate 5 and the floating plate 2 to dampen any jounce or rebound which might occur when placing a mass on, or removing it from, the comparator to thereby reduce the time required for the comparator to reach the null position and also to dampen any vibration from the supporting structure.

Referring to FIG. 2, the thrust bearing 10 includes a housing 10a threadably secured to the upper end of stem 13. The housing 10a contains a hub 10b rigidly connected as at 10c to a clevis 9a of the lower universal joint assembly 9. The housing 10a is rotatable relative to the hub 10b by anti-friction bearings 10d positioned between a lower race 10e secured to the hub 10b and an upper race 10f secured to an end wall of the housing 10a. By the construction and arrangement of the thrust bearing 10 positioned between the load cell 1 and mass suspended from stem 13, revolving torque on the load cell 1 is eliminated.

It has been found that in mass comparators employing load cells, the cells experienced the harmful effects of hysteresis and creep when completely unloading the cell and then reloading with a different mass. The hysteresis, creep and loading errors are greatly reduced by maintaining a tension on the load cell at all times, even during weight exchanges. This is accomplished in the mass comparator of the present invention by the spherical load stop bearing 11 shown in FIG. 2. This load stop bearing comprises a nut 11a having a semi-spherical bearing face 11b threaded on the lower end of stem 13, the bearing face 11b abutting a similarly configured seat 11c secured to the lower fixed plate 6. By turning the nut 11a on the stem 13, the desired tension is applied to the cell 1, and the engagement of the bearing face 11b with the seat 11c maintains the axial alignment of the stem 13 with the load cell 1.

The load cell 1 employed in the comparator of the present invention is of a conventional type known by those skilled in the art, which basically includes a strain member to which strain gages are secured. The gages are wired to form a Wheatstone Bridge circuit across which a fixed excitation voltage is applied. Under no load conditions, there is no output voltage. As force is applied to the cell, minute deflections are imposed on the strain member, resulting in changes in the cross-section of the strain gages. The bridge thus becomes unbalanced and an output voltage is generated which is directly proportional to the applied load. The output voltage, appropriately amplified and measured, can be displayed or printed, or interfaced, to programmers and computers in fully automated control systems.

To improve the pressure compensation of the load cell 1 caused by barometric and wind induced pressure fluctuation, the interior of the cell is vented to the atmosphere by means of a fitting 17 secured to the side wall of the cell housing and communicating with the interior of the cell as shown in FIGS. 2 and 10. The fitting includes a valve 17a and a container 17b communicating at its lower end with the atmosphere. The container is provided with a deliquescent material 17c, such as silica gel, to prevent moist air from entering the interior of the cell and a suitable filter 17d is also provided to prevent any atmospheric particles from entering the cell. When the comparator is in operation, the valve 17a is turned to the open position to vent the interior of the cell housing to the atmosphere. When not in operation, the valve is turned to the closed position.

To complete the structure of the mass comparator, a cylindrical housing 16 extends between the upper and lower fixed plates 5 and 6 enclosing the various components of the comparators to not only protect the components from the atmosphere, but also to protect the operator if any breakage should occur during operation of the comparator.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. A load cell mass comparator comprising a fixed upper plate and a fixed lower plate, a plurality of guide rods extending between said plates, a floating plate slidably mounted on said rods, spring means connected between said upper fixed plate and said floating plate, a load cell positioned below said floating plate, first self-aligning coupling means connecting the upper end of said load cell to said floating plate, second self-aligning coupling means connected to the lower end of said load cell, thrust bearing means connected to said second self-aligning coupling means, a stem connected to said thrust bearing means, said stem extending through said fixed lower plate and adapted to be connected to the mass to be calibrated, whereby the first and second self-aligning coupling means maintain the load cell in axial alignment with the mass being calibrated, and the thrust bearing means prevents any revolving torque from being transmitted to the load cell from said mass.

2. A load cell mass comparator according to claim 1, wherein load stop bearing means are connected to said stem below and adjacent to the lower fixed plate, said load stop bearing means comprising a nut threadably secured to said stem, a semi-spherical bearing face provided on the upper surface of said nut, a semi-spherical seat mounted on the lower face of said lower fixed plate, said semi-spherical bearing face engaging said seat when a mass is removed from said stem, whereby a desired tension is continuously applied to said load cell.

3. A load cell mass comparator according to claim 1, wherein anti-friction bearing means are mounted in said floating plate, said guide rods extending through said bearing means.

4. A load cell mass comparator according to claim 1, wherein the spring means include shock absorber means extending between the upper fixed plate and said floating plate.

5. A load cell mass comparator according to claim 1, wherein the spring means comprises a plurality of coiled tension springs, hook portions provided on each end of each spring, a plurality of slots formed in the upper fixed plate and a plurality of slots formed in the floating plate aligned with the slots in the upper fixed plate, the spring hook portions extending through said slots, pins extending transversely of said slots, means detachably connecting said pins to the respective plates, the spring hook portions adapted to engage said pins.

6. A load cell mass comparator according to claim 5, wherein the hook portions of certain springs engage their respective pins, while the hook portions on the lower end of the remaining springs are spaced from their respective pins, whereby the force of a mass below a predetermined value will be resisted by said certain springs and a force above the predetermined value will cause the pins on the floating plate to engage the lower hook portions on the remaining springs, whereby all the springs will resist the force.

7. A load cell mass comparator according to claim 1, wherein each of the self-aligning coupling means comprises a pair of cooperating clevises having their associated pins disposed normal to each other, said pins having engaging arcuate surfaces to thereby provide a substantially point contact between the pins whereby axial alignment is maintained between the load cell and the mass to be calibrated.

8. A load cell mass comparator according to claim 1, wherein the thrust bearing means comprises a housing secured to the upper end of said stem, a hub positioned within said housing, said hub being connected to said second self-aligning coupling means, and bearing means mounted between said hub and said housing, whereby the hub is rotatable relative to the housing to thereby substantially relieve the load cell of all revolving torque.

9. A load cell mass comparator according to claim 1, wherein a housing extends between the upper and lower fixed plates enclosing the various components of the comparator located between the upper and lower fixed plates, whereby the components are protected from the atmosphere and the operator is protected if any breakage should occur during operation of the comparator.

10. A load cell mass comparator according to claim 1, wherein a fitting is connected to the load cell housing for venting the interior of the cell to the atmosphere to compensate for barometric and wind induced pressure fluctuations, said fitting including a valve and a container communicating with the atmosphere, a deliquescent material contained in the container to prevent moist air from entering the interior of the cell, and a filter mounted in the container to prevent any atmospheric particles from entering the cell.

11. A load cell mass comparator according to claim 1, wherein one end of a hydraulic cylinder is connected to the upper plate, and an eyelet is connected to the opposite end of said hydraulic cylinder, said eyelet being adapted to be suspended from a support, whereby the comparator can be loaded and unloaded by actuation of the hydraulic cylinder, thereby providing a smooth assumption of the mass to be calibrated upon retraction of said hydraulic cylinder.

* * * * *